April 14, 1970    J. V. ALBEDYLL ET AL    3,505,937
ADJUSTABLE EXPOSURE CONTROL FOR PHOTOGRAPHIC CAMERAS
Filed Oct. 23, 1967    2 Sheets-Sheet 1
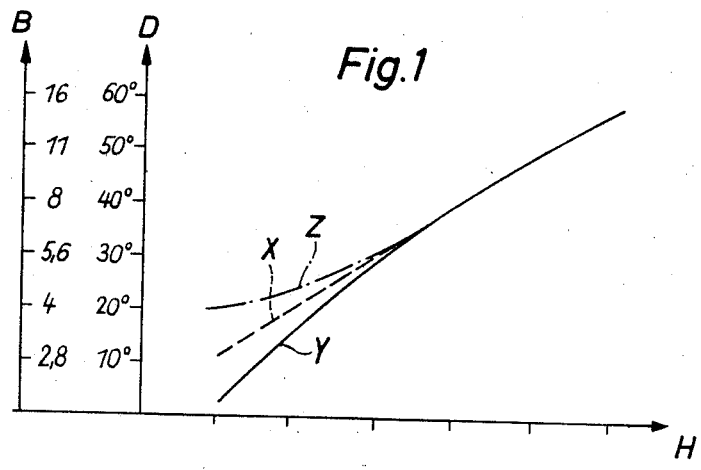
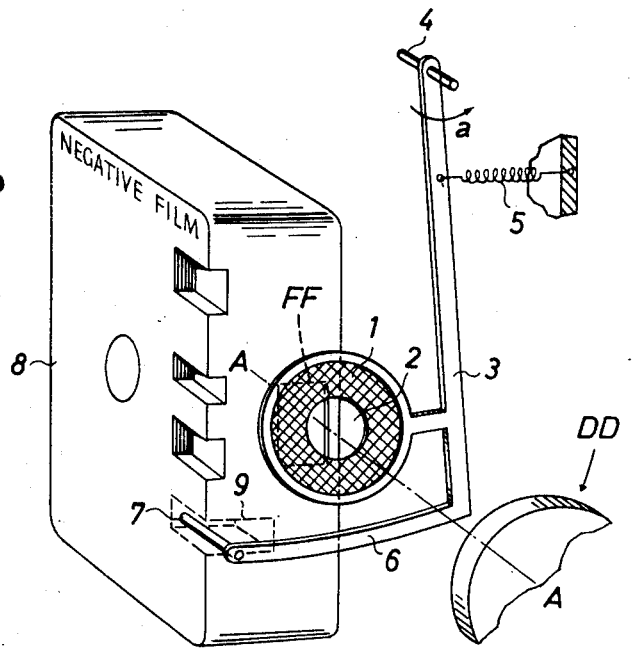
INVENTORS:
JOACHIM v. ALBEDYLL
ERWIN v. WASIELEWSKI
BY Michael S. Striker
Attorney

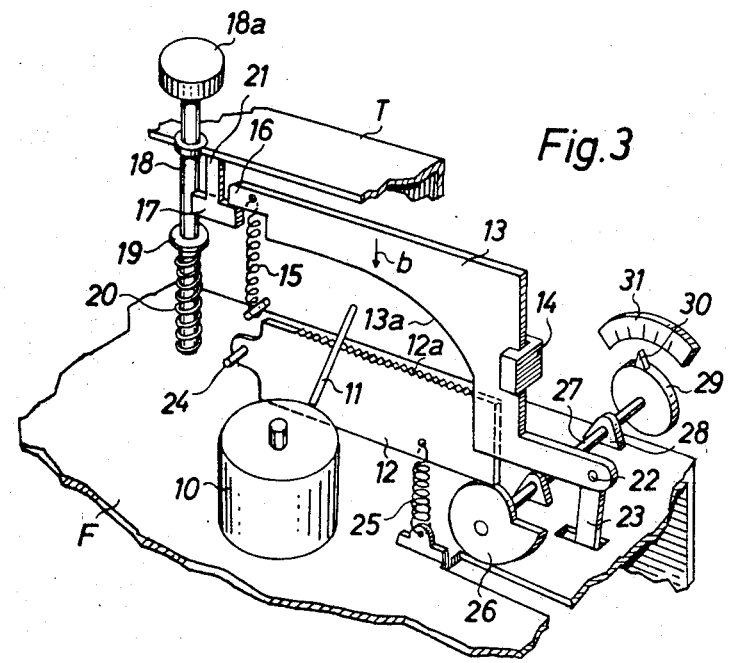
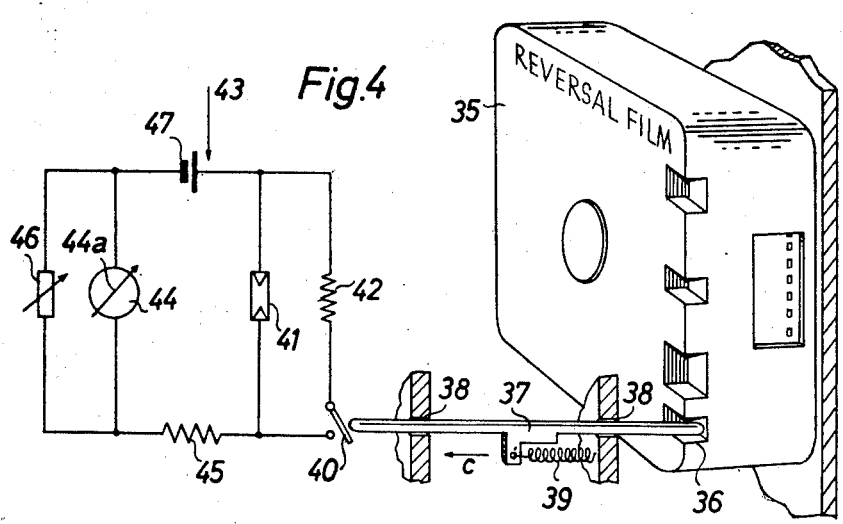

United States Patent Office 3,505,937
Patented Apr. 14, 1970

3,505,937
ADJUSTABLE EXPOSURE CONTROL FOR
PHOTOGRAPHIC CAMERAS
Joachim V. Albedyll and Erwin V. Wasielewski, Munich,
Germany, assignors to Agfa-Gevaert Aktiengesellschaft,
Leverkusen, Germany
Filed Oct. 23, 1967, Ser. No. 677,425
Claims priority, application Germany, Oct. 27, 1966,
A 53,931
Int. Cl. G03b 7/18, 19/18
U.S. Cl. 95—10          7 Claims

ABSTRACT OF THE DISCLOSURE

The rate at which the exposure control device of a movie camera or still camera can change the size of the diaphragm aperture and/or the exposure time as a function of changes in the intensity of scene light and as a function of at least one given film speed can be adjusted in dependency on the type of film of the given speed which is being used or which is about to be used in the camera. The adjustment can be made by hand or automatically in response to insertion of magazines provided with markers which indicate the type of film therein. A filter can be moved across the path of incoming light to change the amount of light that reaches the film when a magazine containing a certain type of film (for example, negative film of given speed or reversal film of the same speed) is inserted into the camera. Alternatively, a magazine for movie film can connect a corrective resistor in parallel with the light-sensitive receiver in the electric circuit of an exposure device which includes a moving coil instrument, or a stop for the needle of the moving coil instrument can be adjusted by hand to change the extent of adjustment of the diaphragm and/or shutter in a still camera as a function of the intensity of scene light.

BACKGROUND OF THE INVENTION

The present invention relates to photographic cameras in general, and more particularly to improvements in still cameras or movie cameras wherein light values (including the size of the diaphragm aperture and/or the exposure time) can be changed automatically as a function of the intensity of scene light.

It is already known to provide a movie camera or a still camera with an automatic exposure control device which can select the light values in dependency on changes in the intensity of scene light. As a rule, the exposure control device selects a predetermined light value for each of a range of light intensities. A series of recommended light values for a range of scene light intensities and for various film speeds is disclosed in DIN Norm 19010. It is also known to construct and assemble the exposure control device of a photographic camera in such a way that light values selected by the exposure control device for a range of light intensities deviate from recommended light values for certain intensities. Some cameras embody exposure control devices which increase the light values beyond recommended values as the intensity of scene light increases, i.e., such exposure devices tend to admit more light than recommended. However, the just described exposure control devices are unsatisfactory in cameras which use color reversal film.

SUMMARY OF THE INVENTION

It is an object of our invention to provide a versatile photographic camera which can make satisfactory exposures with negative film of given film speed as well as with color reversal film of the same film speed.

Another object of the invention is to provide a photographic camera which is equipped with an exposure control device capable of selecting a range of light values in response to changes in the intensity of scene light and wherein the rate at which the light values change as a function of changes in scene light can be altered in dependency on the type of film of given film speed which is being accommodated in or is about to be inserted into the camera.

A further object of the invention is to provide a photographic camera wherein the light values selected by an automatic exposure control device can be increased or reduced, at least for a limited range of light intensities, in dependency on whether the operator uses or intends to use negative film of certain speed or color reversal film of the same speed.

An additional object of the invention is to provide a photographic camera with a manually operable or automatic adjusting system which can reset the exposure control or which can complement the exposure control so that the latter can change the light values in response to changes in the intensity of scene light in accordance with a first ratio when the camera uses a first type of film having a given sensitivity, in accordance with a different second ratio when the camera uses a different second type of film having the same sensitivity, and so forth, to insure optimum exposures regardless of which type of film is being used in the camera.

Our invention is embodied in a movie camera or still camera which comprises an exposure control device (preferably one which includes a moving coil instrument having an output member movable to a plurality of positions as a function of changes in the intensity of scene light, and an operative connection between the output member and the shutter assembly and/or the diaphragm assembly of the camera) capable of determining a light value (namely, exposure times and/or sizes of the diaphragm aperture) for each of a range of intensities of scene light according to at least one given film speed and which is also capable of automatically setting such light values. The camera can accommodate magazines containing different types of film of at least one film speed, particularly magazines with negative film having a given speed or magazines with reversal film having the same given speed. The improvement resides in the provision of manually operated or automatic adjusting means for altering the light values, at least for a portion of the aforementioned range of intensities of scene light, in dependency on the type of film contained in that magazine which is already inserted into or is intended to be used in the camera so that the thus altered and automatically set light values deviate from light values determined according to the film speed.

For example, the adjusting means may comprise means for progressively altering light values automatically set with decreasing intensities of scene light below the light values determined according to the film speed for decreasing the intensity of scene light active on the film when the camera contains a magazine which is loaded with negative film having a given speed, for progressively altering light values automatically set with decreasing intensities of scene light above the light values determined according to the film speed for increasing the intensity of scene light active on the film when the camera contains a magazine loaded with reversal film having a given speed, for progressively altering light values automatically set with increasing intensities of scene light above the light values determined according to the film speed for increasing the intensity of scene light when the magazine in the camera is loaded with negative film having a given speed, and/or for progressively altering light values automatically set with increasing intensities of scene light below the light values determined according to the film speed for increasing the intensity of scene light active on the film when the camera contains a magazine which is loaded with reversal film having a given speed.

The adjusting means can comprise a filter which is movable across the optical axis of the camera when the latter contains a first type of film having a given speed but is moved away from registry with the optical axis when the camera contains another type of film having the same speed. Alternatively, the adjusting means may influence the position of a customary stop for the needle of a moving coil instrument in an exposure control device wherein the position of the needle is detected by a sensing device which adjusts the shutter assembly and/or the diaphragm assembly of the camera. In such cameras, the adjusting means may comprise an index or a like manually operated member which can adjust the stop through the intermediary of a cam, whereby the position of the index may be selected in dependency on the type of film contained in a magazine which is already accommodated in or is about to be inserted into the camera. Still further, the adjusting means can influence the electric circuit of an exposure control device, for example, by connecting a corrective resistor in parallel with a light-sensitive receiver which controls the flow of current through a moving coil instrument as a function of the intensity of scene light. The resistor can be connected in parallel with the light sensitive receiver in response to displacement of a trip by means of a marker provided on a magazine which contains a certain type of film having a given speed, for example, color reversal film or negative film of the same speed.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagram showing the manner in which the ratio of aperture sizes furnished by the adjustable diaphragm of a camera to changes in the intensity of scene light can be modified in dependency on the type of film which is being used in the camera;

FIG. 2 is a fragmentary perspective view of a movie camera which embodies one form of our invention and wherein the ratio of light values to intensities of scene light can be modified by means of a filter;

FIG. 3 is a fragmentary perspective view of a still camera wherein the ratio of aperture sizes and/or exposure times to intensities of scene light can be modified by means of an adjusting system influencing an adjustable exposure control which includes a moving coil instrument; and FIG. 4 is a fragmentary partly diagrammatic and partly perspective view of a second movie camera wherein the ratio of exposure time and/or aperture sizes to intensities of scene light can be modified by changing the characteristics of an electric circuit which includes a light sensitive receiver and a moving coil instrument.

DESCRIPTION OF THE PREFERRED EMBODIMENTS

FIG. 1 shows a system of coordinates wherein the intensity H of scene light is measured along the abscissa, the angular displacement (in degrees) of the output member in a moving coil instrument along a first ordinate D, and the sizes of the diaphragm aperture along a second ordinate B. It is assumed that the position of the output member of the moving coil instrument automatically determines the size of the aperture in a still camera or in a motion picture camera. The curve X (indicated by phantom lines) illustrates the ratio between the intensity of scene light and the aperture size (which is a function of the angular position of the output member in the moving coil instrument) in accordance with recommendations in DIN Norm 19010. The curve Y illustrates the manner in which the curve X can be modified to deviate from recommended norm when the film in the camera is a reversal film of a given speed. The phantom-like curve Z indicates the manner in which the ratio of scene light intensity to the size of exposure aperture can deviate from recommended norm when the film used in the camera is a negative film of the same speed.

The just described deviations from a recommended norm can be achieved by resorting to a camera a portion of which is shown in FIG. 2. This camera is a motion picture camera and utilizes magazines 8 of the type having markers adapted to displace a sensing or scanning member 7 forming part of an arm on a lever 3 which carries a ring-shaped grey filter 1 having a central opening 2. The lever 3 is turnable about the axis of a fixed pivot pin 4 and is biased by a spring 5 which tends to maintain it in one of two end positions. The exposure control device of the camera embodying the structure of FIG. 2 is designed to provide a ratio of scene light intensity to exposure aperture size as represented by the curve Y of FIG. 1. The diaphragm is shown schematically at DD and the optical axis of the camera is shown by the line A—A. The sensing member 7 bears against the left-hand side face of the magazine 8 whereby the filter 2 extends across the optical axis A—A and reduces the amount of light which can reach a film frame FF, at least when the diaphragm DD defines a relatively large aperture. When the aperture size is reduced to a certain value, for example, to f/stop "8," the light which can pass through such small aperture can also pass through the central opening 2 of the filter 1, i.e., the latter cannot affect the amount of light which reaches the film in the magazine 8. This is indicated in FIG. 1 by that portion of the curve Y which coincides with the curves X and Z. The left-hand side face of the magazine 8 constitutes a marker which automatically places the filter 1 into the illustrated position when the magazine 8 contains negative film of given speed.

If the user inserts a magazine which contains reversal film of the same speed, the spring 5 is free to contract and turns the lever 3 in the direction indicated by arrow a whereby the filter 1 moves away from registry with the optical axis A—A. This is due to the fact that the magazine for reversal film contains a different marker which, for the sake of better understanding, is indicated in FIG. 2 by phantom lines 9 with the understanding, however, that this marker 9 is not provided on the magazine 8 because the latter is assumed to contain a supply of negative film. The marker 9 is constituted by a recess or cut-out in the left-hand side face of the magazine for reversal film and its depth is such that the spring 5 is free to move the filter 1 out of the way so that the amount of light which can reach a frame of the reversal film is determined solely by the aperture of the diaphragm DD which is adjustable in dependency on the intensity of scene light. The ratio of scene light intensity to the size of the aperture then corresponds to the curve X or Z of FIG. 1.

It is further possible to automatically or manually adjust the transmissivity of the filter 1 (either stepwise or gradually) in dependency on the intensity of scene light. By proper selection of the diameter of the opening 2 and of the transmissivity of filter 1 from the periphery toward the opening 2, the camera can alter the ratio of scene light intensity to the amount of light which reaches an unexposed film frame with a desired degree of accuracy and within a desired range of light sensitivities when the camera is loaded with negative film.

The marker of the magazine and the parts 1–7 constitute an adjusting system which can alter the ratio of light values to a portion of the range of scene light intensities in dependency on the type of film of given sensitivity or speed in that magazine which is inserted into the camera.

FIG. 3 illustrates a portion of a still camera wherein the exposure control device comprises a moving-coil instrument 10 having an oscillatable output member or needle 11 which overlies an adjustable back support or stop 12. The exposure control device further includes a customary light sensitive receiver (not shown) which causes the needle 11 to change its angular position with reference to its housing as a function of changes in the intensity of scene light. A reciprocable sensing or scanning member 13 is guided in bearings 14 (only one shown) and is biased toward the needle 11 by a helical spring 15. A projection or extension 16 of the sensing member 13 bears against an abutment or arm 17 provided on a shutter release trigger 18 whose knob 18a is depressible by hand when the user wishes to make an exposure. The stem of the trigger 18 carries a ring-shaped retainer 19 for a strong return spring 20 which bears against a portion F of the camera housing and biases the trigger to the starting or idle position shown in FIG. 3 to thereby hold a suitably curved camming edge 13a of the sensing member 13 away from the needle 11. The bias of the return spring 20 is stronger than that of the spring 15 so that the sensing member 13 remains in the illustrated inoperative position when the user moves his or her finger away from the knob 18a. The abutment 17 then bears against a stationary stop 21 provided on the top wall T of the camera housing. A motion transmitting pin 22 connects the sensing member 13 with a link 23 which forms part of the diaphragm and/or shutter assembly in the camera and can select the size of the aperture as a function of changes in the intensity of scene light, i.e., as a function of the angular position of the needle 11. The link 23 can also adjust the exposure time or it can adjust only the exposure time or only the size of the aperture as a function of the angular position of the needle 11. The manner in which the shutter and/or diaphragm assembly may be adjusted by the link 23 is well known from the art of cameras.

The back support or stop 12 is adjustable by being pivotable about the axis of a fixed horizontal pin 24 and is biased by a helical spring 25 which causes its left-hand end portion to bear against the face of a turnable adjusting cam 26. Alternatively, the stop 12 can be fulcrumed intermediate its ends so as to change the setting of the diaphragm and/or shutter assembly in a first sense when the needle 11 overlies its left-hand portion (at one side of the fulcrum) and in a different sense when the needle 11 overlies its right-hand portion at the other side of the fulcrum. In other words, the stop 12 can resemble a one-armed lever (as shown in FIG. 3) or a two-armed lever or balance beam. The cam 26 is affixed to a camshaft 27 which is turnable in fixed bearings 28 and carries a manually turnable index wheel 29 provided with an index 30 movable into registry with selected graduations of a fixed scale 31 which is secured to or provided on the housing of the camera.

The operator will adjust the angular position of the adjusting cam 26 by hand in dependency on the type of film which is being used in the camera of FIG. 3. The peripheral face of the cam 26 then causes the stop 12 to turn about the axis of the pivot pin 24 and to assume a position which is a function of the type of film in the camera housing. In other words, the cam 26 cooperates with the spring 25 to change the inclination of the serrated edge face 12a on the stop 12 and to thus determine the extent to which the sensing member 13 can descend (arrow b) when the trigger 18 is depressed in order to make an exposure. In this way, the operator makes sure that the film frame is either underexposed or overexposed, at least within a certain range of light intensities, as a function of the type of film of given sensitivity which is being used in the camera. The adjusting means for the stop 12 of the exposure control device shown in FIG. 3 includes the parts 25–30.

FIG. 4 shows a portion of a motion picture camera which utilizes magazines 35. The magazine 35 shown in FIG. 4 has a marker in the form of a notch 36 which receives one end of a sensing rod 37 reciprocably mounted in bearings 38 provided in the housing of the camera. The sensing rod 37 is biased by a spring 39 which causes it to bear against the surface bounding the deepmost portion of the recess 36. Therefore, the left-hand end or tip of the rod 37 remains spaced from the movable contact of a normally open switch 40 which is installed in the electric circuit 43 of the exposure control device. When the switch 40 is closed, it connects a fixed corrective resistor 42 in parallel with a light-sensitive receiver 41. This receiver 41 is connected in parallel with a moving-coil instrument 44 having an output member or needle 44a. A balancing resistor 45 is connected in series with the light sensitive receiver 42 and the circuit 43 further comprises a battery 47 or another suitable source of electrical energy and a variable resistor 46 in parallel with the moving coil instrument 44. The resistance of the resistor 46 can be varied by hand or automatically in response to insertion of the magazine 35 to account for the sensitivity or speed of film in the magazine. It is clear that the switch 40 can be omitted if the circuit 43 comprises two or more balancing resistors 45, one for each type of film which is to be used in the motion picture camera, and if the rod 37 is movable axially through different distances to connect selected resistors 45 into the circuit 43 in dependency on the type of film in that magazine which is being inserted into the camera housing. The depth of the recess 36 in a given magazine determines that compensating resistor 45 which is connected into the circuit 43 when the respective magazine is properly installed in the housing.

FIG. 4 illustrates the sensing rod 37 in a position it assumes when the magazine 35 contains reversal film of given speed. If the magazine 35 is replaced with a magazine which contains negative film of the same speed, the latter magazine is without a recess 36 or its recess 36 is so shallow that the magazine causes the rod 37 to close the switch 40. Thus, the rod 37 then moves axially in the direction indicated by an arrow c and the switch 40 connects the corrective resistor 42 in parallel with the light sensitive receiver 41. This insures the flow of a stronger current through the moving coil instrument 44, particularly when the intensity of scene light is weak, so that the receiver 41 offers a high resistance to the flow of current therethrough. Consequently, deflection of the needle 44a is greater than when the switch 40 is open and the motion transmitting system which adjusts the diaphragm assembly and/or the shutter assembly as a function of the position of the needle 44a will reduce the size of the aperture and/or the exposure time below that value which would correspond to the angular position of the needle 44a for the same light intensity but with the camera containing a magazine 35 with reversal film therein. The resistance of the resistor 42 is selected in such a way that it not only reduces the tendency of the circuit 43 to admit relatively more light when the intensity of scene light is weaker but that it actually reverses such tendency and causes the circuit to reduce the size of the diaphragm aperture below that which is considered average for a certain range of low light intensities and for a given film speed.

In the camera of FIG. 4, the adjusting means includes the marker 36 and parts 37–40. The switch 40 constitutes the means for connecting the resistor 42 into the circuit 43.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a photographic camera which comprises an exposure control device adapted to determine a light value for each of a range of intensities of scene light according to at least one given film speed, to automatically set such light values and to accommodate magazines containing different types of film of at least said one film speed, that improvement which consists in the provision of adjusting means for altering said light values, at least for a portion of said range of light intensities, in dependency on the type of film contained in that magazine which is being used in the camera, so that the thus altered and automatically set light values deviate from the light values determined according to the said film speed, said exposure control device including an electric circuit comprising a light sensitive receiver and at least one corrective resistor connectable into said circuit, said adjusting means comprising means for connecting said resistor into said circuit when the camera accommodates a magazine containing a certain type of film.

2. The improvement as defined in claim 1, wherein said resistor is connectable in parallel with said receiver.

3. In a photographic camera which comprises an exposure control device adapted to determine a light value for each of a range of intensities of scene light according to at least one given film speed, to automatically set such light values and to accommodate magazines containing different types of film of at least said one film speed, that improvement which consists in the provision of adjusting means for altering said light values, at least for a portion of said range of light intensities, in dependency on the type of film contained in that magazine which is being used in the camera, so that the thus altered and automatically set light values deviate from the light values determined according to the said film speed, said adjusting means comprising movable apertured filter means.

4. The improvement as defined in claim 3, wherein said filter means is movable between a first position in which it extends across the optical axis of the camera and a second position away from registry with said axis.

5. The improvement as defined in claim 4, wherein said filter means is movable to first position in response to insertion of magazine containing a certain type of film.

6. In a photographic camera which comprises an exposure control device adapted to determine a light value for each of a range of intensities of scene light according to at least one given film speed, to automatically set such light values and to accommodate magazines containing different types of film at least said one film speed, that improvement which consists in the provision of adjusting means for altering said light values, at least for a portion of said range of light intensities, in dependency on the type of film contained in that magazine which is being used in the camera, so that the thus altered and automatically set light values deviate from the light values determined according to the said film speed, said exposure control device comprising a moving coil instrument having an output member movable to a plurality of positions as a function of changes in the intensity of scene light, an adjustable shutter assembly, an adjustable diaphragm assembly, and an adjustable operative connection between said output member and at least one of said assemblies to adjust the respective assembly as a function of changes in the intensity of scene light and to thus select said predetermined light values, said operative connection comprising adjustable stop means, sensing means movable toward said stop means to clamp the output member against said stop means, and motion transmitting means connecting said sensing means with said one assembly, said adjusting means comprising means for adjusting said operative connection in dependency on the type of film in the magazine which is used in the camera and said means for adjusting said operative connection comprising means for adjusting said stop means.

7. In a photographic camera which comprises an exposure control device adapted to determine a light value for each of a range of intensities of scene light according to at least one given film speed, to automatically set such light values and to accommodate magazines containing different types of film of at least said one film speed, that improvement which consists in the provision of adjusting means for altering said light values, at least for a portion of said range of light intensities, in dependency on the type of film contained in that magazine which is being used in the camera, so that the thus altered and automatically set light values deviate from the light values determined according to the said film speed, said adjusting means comprising filter means movable between a first position in which it extends across the optical axis of the camera and a second position away from registry with said axis, said exposure control device comprising an adjustable diaphragm defining an aperture of variable size in registry with said optical axis and said filter means having an opening which registers with said aperture in the first position of said filter means so that said filter means intercepts more light when the size of said aperture is large but intercepts less light when the size of said aperture is reduced in dependency on the intensity of scene light.

References Cited
UNITED STATES PATENTS

| | | | |
|---|---|---|---|
| 3,038,399 | 6/1962 | Morelle. | |
| 3,208,363 | 9/1965 | Easterly et al. | 352—72 |
| 3,312,158 | 4/1967 | MacMillin et al. | 352—78—XR |
| 3,314,344 | 4/1967 | Anwyl et al. | 352—72 XR |
| 3,425,326 | 2/1969 | Von Wasielewski | 352—72 XR |

NORTON ANSHER, Primary Examiner

J. F. PETERS, JR., Assistant Examiner

U.S. Cl. X.R.

352—141, 72; 95—31